United States Patent [19]

Gable et al.

[11] 3,757,927
[45] Sept. 11, 1973

[54] BAR STOCK STORAGE DISPENSING AND FEEDING APPARATUS AND METHOD
[75] Inventors: Charles E. Gable; Marcus A. Gotsch, both of Fort Wayne, Ind.
[73] Assignee: General Electric Company, Fort Wayne, Ind.
[22] Filed: Sept. 13, 1971
[21] Appl. No.: 179,786

[52] U.S. Cl. .................... 198/105, 82/2.7, 198/211, 214/1 PB
[51] Int. Cl. ............................................. B65g 37/00
[58] Field of Search............ 214/1 P, 1 PB, 1.1–1.3, 214/338, 339, 8.5 H; 82/2.7; 198/211, 105; 221/173–175

[56] References Cited
UNITED STATES PATENTS
3,419,160 12/1968 Azuma.............................. 214/1.2
2,856,895 10/1958 Anderson et al............. 214/1 PB X
3,055,490 9/1962 Anderson........................... 198/211
1,190,698 7/1916 Abramsen....................... 214/1 P X
3,655,067 4/1972 White............................... 214/1 PB
2,933,202 4/1960 Lanstrom.......................... 214/1 PB
3,563,416 2/1971 Dobrink............................. 198/211

Primary Examiner—Gerald M. Forlenza
Assistant Examiner—Frank E. Werner
Attorney—John M. Stoudt et al.

[57] ABSTRACT

Method and apparatus for storing dispensing and feeding bars of stock to a material processing device includes a rotatable magazine to and from which bars of stock are transferred laterally and a bar support rack which receives the bars one at a time from the magazine, and transfers them axially into or out of a device such as a lathe for machining. Means are provided for the bidirectional transfer of bars of stock between the magazine and the support rack so that an unused portion of a bar of stock may be removed from the lathe and transferred back into the magazine for storage or disposal. A bar of stock is moved axially along the bar support rack by a pair of skewed concave rollers so that a bar is simultaneously moved axially and rotated about its axis to thus aid in inserting the bar into the lathe spindle collet.

16 Claims, 8 Drawing Figures

Patented Sept. 11, 1973

INVENTORS:
CHARLES E. GABLE,
MARCUS A. GOTSCH,
BY Ralph E. Kisher Jr.
ATTORNEY.

Patented Sept. 11, 1973

INVENTORS:
CHARLES E. GABLE,
MARCUS A. GOTSCH,

BY Ralph E. Krisher Jr.

ATTORNEY.

Patented Sept. 11, 1973

INVENTORS:
CHARLES E. GABLE,
MARCUS A. GOTSCH,

BY Ralph E. Krisher Jr.

ATTORNEY.

Patented Sept. 11, 1973 3,757,927

INVENTORS:
CHARLES E. GABLE,
MARCUS A. GOTSCH,

BY Ralph E. Kroher Jr.
ATTORNEY.

BAR STOCK STORAGE DISPENSING AND FEEDING APPARATUS AND METHOD

BACKGROUND OF THE INVENTION

The present invention relates to methods and apparatus for handling raw material relative to a machine for processing that raw material, and especially to methods and apparatus for transferring materials in the form of bars of stock to and from a machine for processing a bar of stock by revolving the bar about its axis relative to a cutting tool. The present invention is particularly suitable for utilization in conjunction with a machine such as a lathe.

One procedure used heretofore for supplying raw materials to a lathe includes a manual operation of inserting a bar into a spindle collet and tightening the collet. Automated bar feeding devices for automatic lathes have also been proposed and one type of such device includes a cylinder containing several pieces of bar stock in several holes in the cylinder running its length approximately parallel to and off set from the cylinder axis. A push rod is provided for each of these holes to force the bar stock out of the selected hole at the appropriate time.

The above mentioned axially arranged cylinder suffers from a number of substantial drawbacks and among other things, it is not convenient to select a specific bar of stock, perform some machine operations on it and subsequently return that bar or the remaining portion of it to the cylinder for storage until it is again needed. It is also inconvenient to load such cylinders since the raw material or bar stock must be inserted along the axis of the cylinder and if the stock is of any substantial length, the process is cumbersome and requires an inordinant amount of clearance around the machine. It is also difficult with automatic feed devices of this category to intermix different types of bar stock and select the appropriate type for machining at the appropriate time.

Some other types of automatic feed systems supply bar stock to a position immediately adjacent a machine (e.g., a lathe) and make use of a lateral transfer arrangement as opposed to an axial transfer. These arrangements do not overcome all of the above identified problems and particularly with respect to convenience of loading and retrieving different types of bar stock.

It will thus be understood that it would be very desirable to provide structural arrangements and methods that could be readily utilized for feeding a length of various types of materials to a machine, use part of the length of material in the fabrication of one or more machined or otherwise treated parts therefrom, and then retrieve and store the balance of the length of material. This type of arrangement and/or method would be of particular value in the manufacture of dynamoelectric machine shafts wherein only one or a few parts such as shafts are made from a length of bar stock on a small order basis. Typically, only three to five 12 inch shafts may be made at one time, whereas a typical bar stock length would be on the order of 20 feet long. Thus, the ease of retrieval and storage of unused material of a given type of bar stock until further need therefor can in fact be very important in practice.

Accordingly, it is one object of the present invention to provide methods and apparatus that facilitate initial storage, utilization, retrieval, and subsequent storage of bar stock material.

It is another object of the present invention to provide a bar stock storage dispensing and feeding system which allows for the quick and easy selection of any one of a number of different kinds of bar material.

It is a further object of the present invention to quickly transfer a partially used bar of stock of a first type to a bar stock storage magazine and transfer a second type of bar stock away from the bar stock storage magazine.

A still further object of the present invention is to provide a bar support rack which axially inserts or removes a bar of stock from a machine collet while simultaneously imparting a rotary motion to that bar to aid the insertion process.

Yet another object of the present invention is to provide methods and arrangements that fulfill one or more of the foregoing objects and whereby support and confinement is provided for that portion of a length of bar stock remote from a machine collet.

SUMMARY OF THE INVENTION

In carrying out the objects of the invention in one form, we provide a bar stock storage dispensing and feeding system comprising a rotatable magazine of a plurality of slotted spaced discs supported on and rotatable about a common axis, a loading platform parallel to and adjacent the magazine, an unloading platform or trough parallel to and adjacent the magazine on the side opposite from the loading platform, and a bar support rack also adjacent the magazine on the same side as the trough and axially aligned with the axis of revolution of a lathe or other auxiliary machine. Selectively actuable means are also provided for moving a bar in the trough toward either the bar support rack or the magazine, thus providing for bidirectional transfer of bars between the bar support rack and the magazine. The bar support rack is provided with an axial drive arrangement comprising a pair of skewed concave rollers which selectively grip bars of stock to both rotate and axially move individual bars for insertion into and removal from the auxiliary machine. Rotation of the stock aids the axial insertion process and facilitates the insertion of bars of stock that are slightly damaged on the leading end whereas simple non-rotative axial movement of the bar stock might result in the bar of stock hanging up on the lathe collet or other close fitting receiver of an auxiliary machine. The bar support rack is also provided with means in the form of rollers for, during machining, limiting whip of unconfined portion of the bar of stock. Without these retaining rollers, long pieces of bar stock may cause substantial damage to persons and equipment. This damage could occur when a slight off center situation occurs during revolution of the bar of stock. Of course, any off center condition produces additional forces which tend to cause additional off centering and this cumulative process may result in a wildly swinging or whipping free end of the bar stock material.

The subject matter which we regard as our invention is set forth in the appended claims. The invention itself, however, together with further objects and advantages thereof may be better understood by referring to the following more detailed description taken in conjunction with the accompanying drawings.

DESCRIPTION OF THE PREFERRED EMBODIMENT

Figure 1:
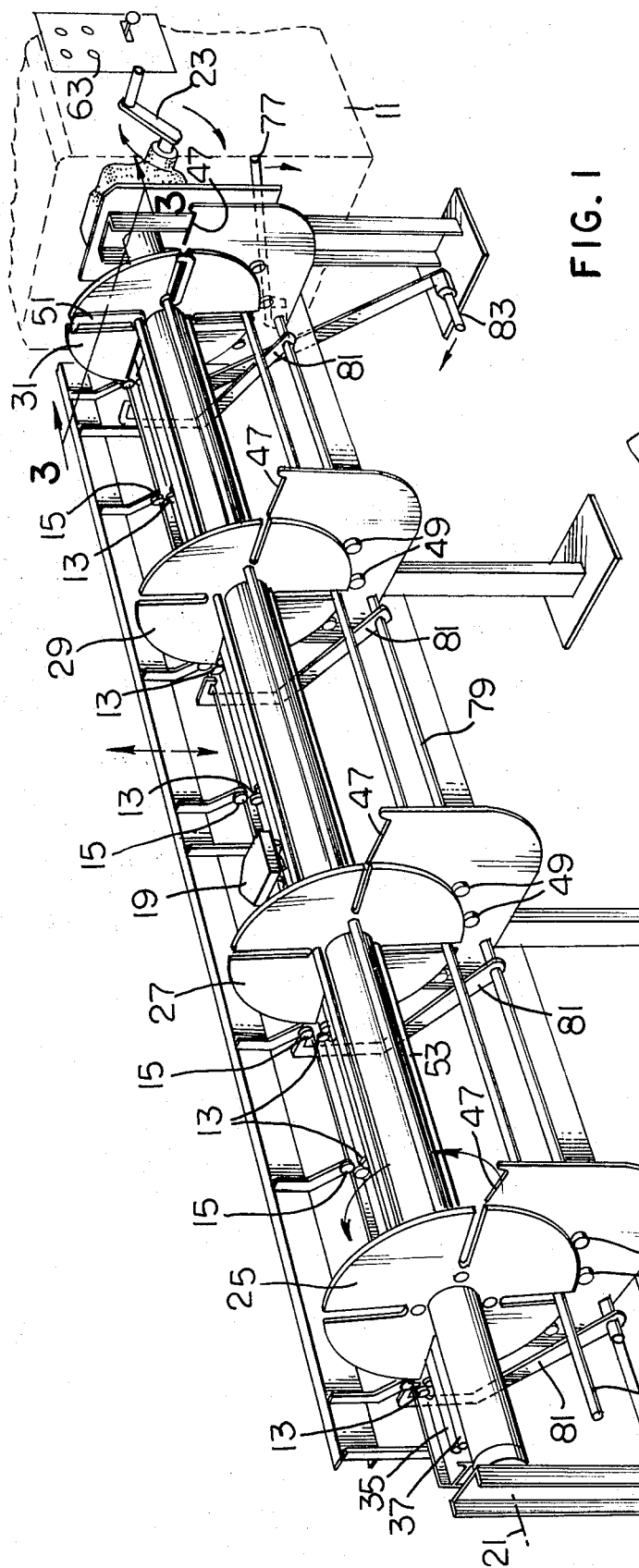
FIG. 1 is a perspective view of apparatus embodying the present invention in one form.
Figure 5:
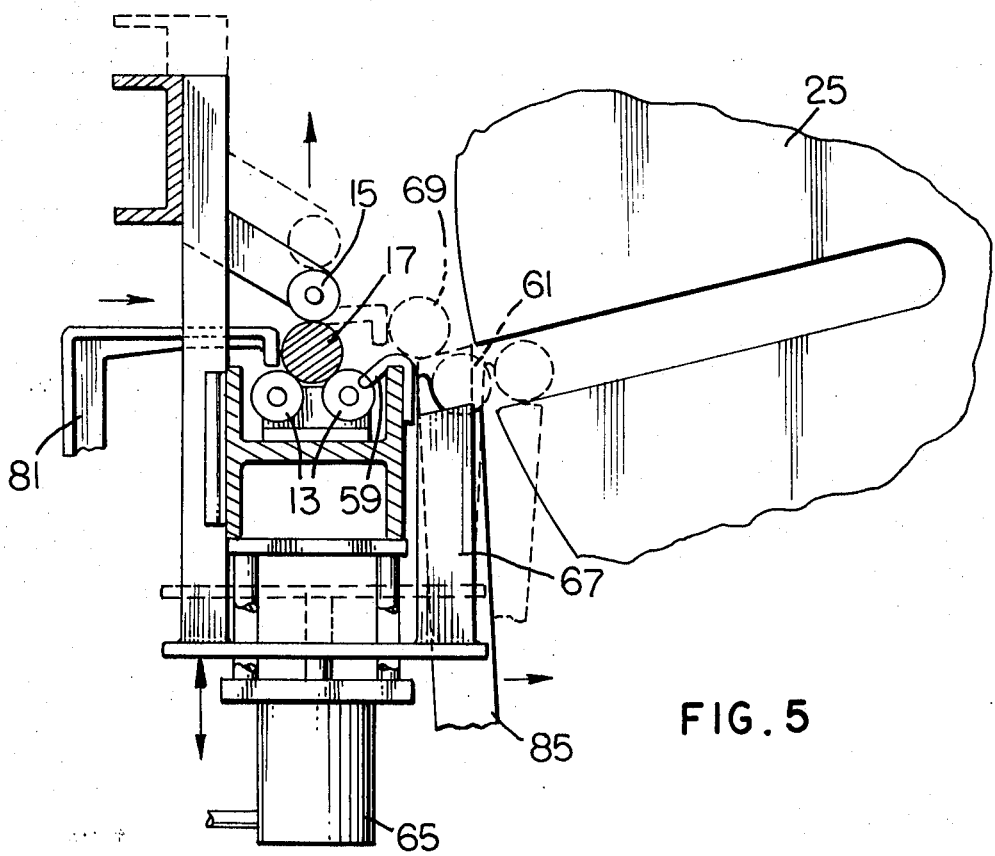
FIG. 5 is a cross sectional view illustrating the elements of the present invention which impart lateral motion to a bar of stock.
Figure 6:
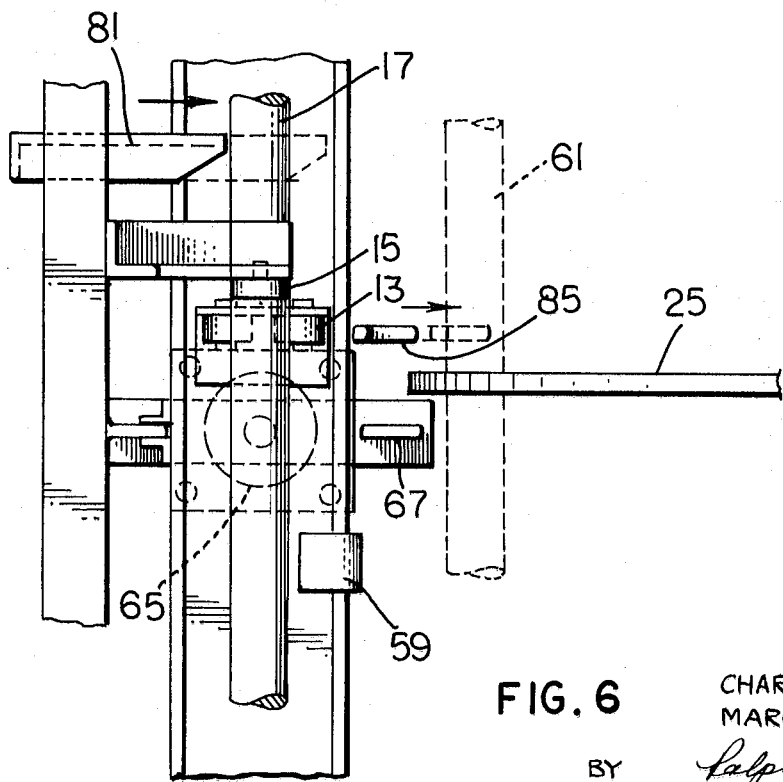
FIG. 6 is a top view of the portion of the invention illustrated in FIG. 5.

With reference first to the perspective view of FIG. 1, the present invention may be used to particular advantage in conjunction with any suitable machine for processing stock material. However, for purposes of discussion, in the following detailed description, the illustrated machine 11 will be referred to as a lathe, although, it should be understood that this reference is for the purpose of simplifying the description only. The lathe 11 will have a machining axis about which its spindle collet rotates and on which may be located a second collet, dead center, or other tail stock like structure for supporting the otherwise free end of the work piece. The machine as thus far described would of course have to be hand loaded by merely inserting a bar of stock into the spindle collet. In place of such a hand loading operation, the present invention provides a bar support rack comprising pairs of rollers 13 on which the bar of stock may rest. A third roller 15 is associated with each pair of rollers to insure that a bar of stock 17 as shown in FIG. 5 is held in alignment with the machine axis. This third or retaining roller 15 is selectively movable so that the bar of stock 17 may be laterally removed from the bar support rack as desired. An axial transfer means 19 is provided for moving the bar 17 toward and away from the machine 11 for insertion and removal respectively.

Figure 2:
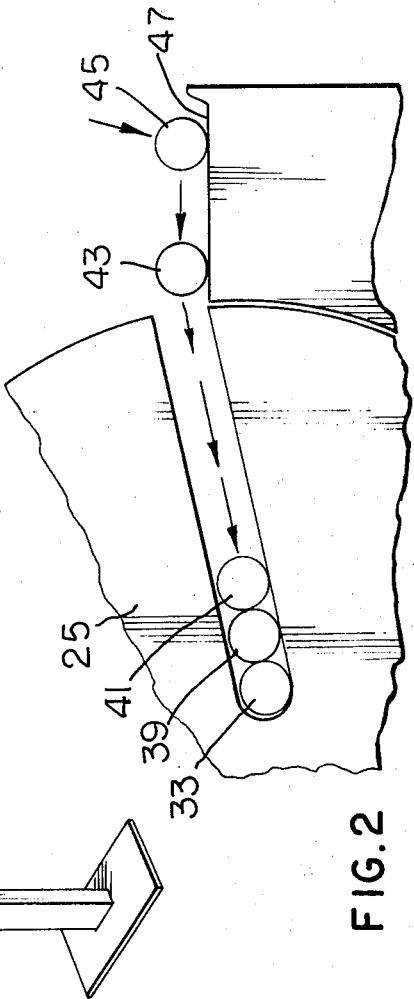
FIG. 2 is a side view of a portion of one of the discs and the loading platform of the FIG. 1 apparatus.

Storage means are also provided in the form of a magazine which is rotatable about the axis 21 by revolving the hand crank 23. This rotatable magazine comprises a plurality of plates or discs with retaining means (e.g., slots) or other members 25, 27, 29 and 31 which are supported on and rotatable about the common axis 21. Corresponding slots in each discs are aligned and adapted to store a plurality of bars of stock 33, 35, and 37. A loading platform 47 is adapted to support a bar of stock in a position removed from but substantially parallel to the axis 21. To load a bar of stock into the magazine, it is simply necessary to place the bar on the loading platform such as at 45 of FIG. 2 and then roll it toward one of the slots as at 43. If the clamp or radial keeper to be discussed subsequently is in the proper position, this bar may then simply be rolled into the slots to the position illustrated as 41. Once a bar is in the appropriate slots, movement of the crank handle 23 will result in that bar being revolved about the fixed axis 21.

Figure 3:
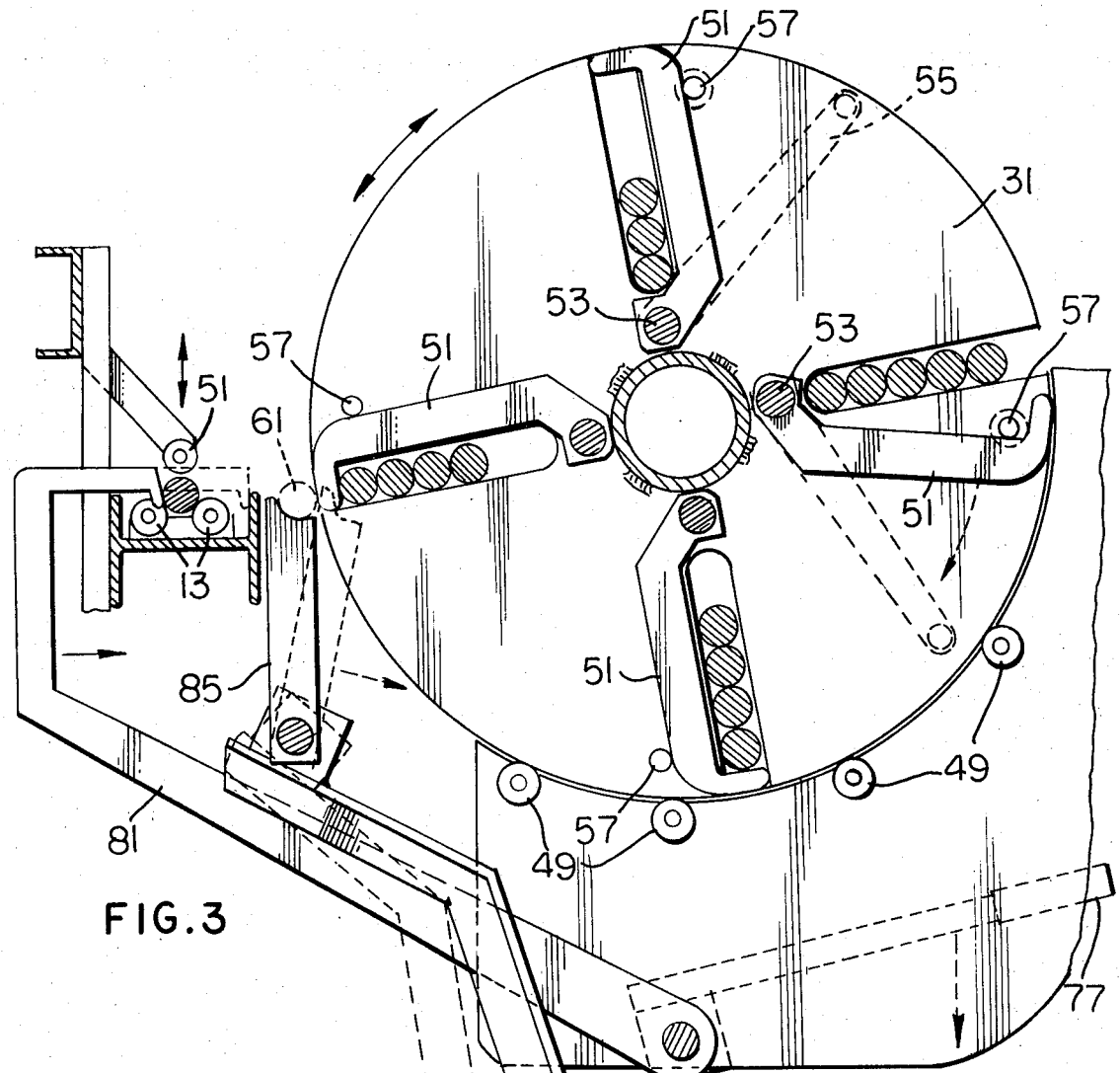
FIG. 3 is a cross sectional view along the line 3—3 of FIG. 1.
Figure 4:
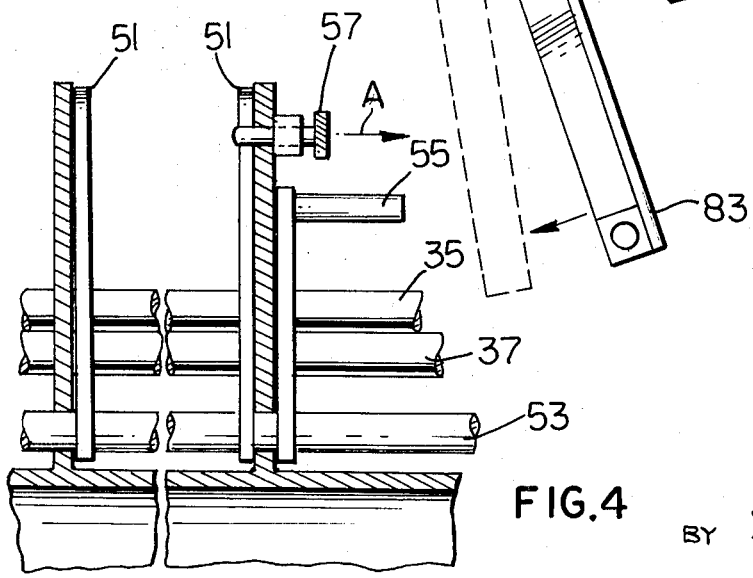
FIG. 4 is a view partially in cross section illustrating the relationship of clamps or radial keepers on adjacent ones of the discs shown in FIG. 2.

The magazine may merely be supported in bearings at the extreme ends of its axis 21 or additional support may be provided by the rollers 49. These rollers as illustrated in FIGS. 1 and 3 are mounted on a plate, the exposed top edge of which constitutes the aforementioned loading platform 47. It should be clear from a consideration of FIGS. 1 and 4 that this plate which supports the rollers 49 will prevent the bar stock from falling downwardly out of the slots in the discs if it were extended sufficiently far around the lower portion of the disc. However, it is preferred that a series of clamps or radial keepers 51 be provided to prevent the inadvertent removal of a bar from a slot. As illustrated, there is one keeper 51 for each slot in each disc and each of the keepers associated with a given aligned set of slots in the several discs is attached to a common actuating rod such as 53 of FIGS. 1, 3 and 4. Also attached to this common actuating rod 53 is an actuating lever 55 which an operator can grasp and actuate and thus move all of the keepers associated with a given bar of stock in the magazine. A spring loaded pin 57 is provided to insure that the keeper 51 stays in its closed position until actuated by the operator. Thus, the operator must pull the pin 57 in the direction of the arrow A shown in FIG. 4 prior to pulling the lever 55 to release a bar of stock.

It should be clear from FIGS. 1 and 3 that several different types of bar stock such as for example, bars of harder and softer steels, or bars of different materials, may be easily segregated in the magazine by merely loading them into different aligned slots. Once the magazine is loaded (it can, of course, be loaded during lathe operation) the desired set of slots is aligned with a trough having a lip 59 shown in FIG. 5. The proper alignment is illustrated in FIGS. 3 and 5 and is achieved by rotating the crank 23 to the desired location. This desired location may be defined by a detenting system associated with the magazine or the magazine may be merely visually aligned. Considering FIG. 3, once the magazine is properly aligned the spring loaded plunger 57 is pulled and the lever arm 55 moved so as to raise the keeper 51 and allow a single bar of stock to roll into the trough. The lever and the several associated keepers 51 are then returned to their normal bar retaining position and the spring loaded plunger 57 released so as to lock the keepers in place. The thus deposited bar of stock is illustrated as 61 in FIGS. 3 and 5. One of the buttons on the control panel 63 is now depressed to actuate an air cylinder 65 of FIG. 5 which raises both the retaining roller 15 and the lateral transfer means 67 which in turn raises the bar of stock from its position 61 to a position such as 69. Due to the fact that the lateral transfer means has its upper surface sloped somewhat, as the air cylinder actuates the bar of stock will move not only up but toward the left and eventually will reach a position where it will roll over the lip 59 and into the bar support rack assuming the position illustrated as 17 in FIG. 5. The air cylinder 65 may be manually deactivated or the deactivation may occur automatically whereupon the lateral transfer means will descend as will the retaining roller 15 and the bar of stock 17 will be in position to be transferred axially into the lathe 11. The axial transfer means 19 of FIG. 1 is illustrated in detail in FIGS. 7 and 8.

Figure 7:
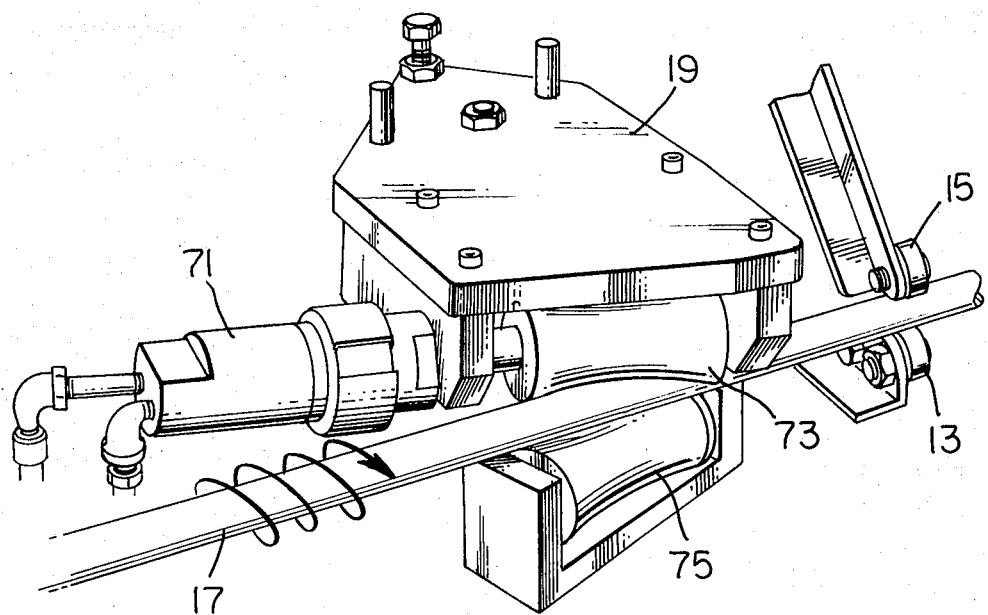
FIG. 7 is a perspective view of the axial transfer means.
Figure 8:
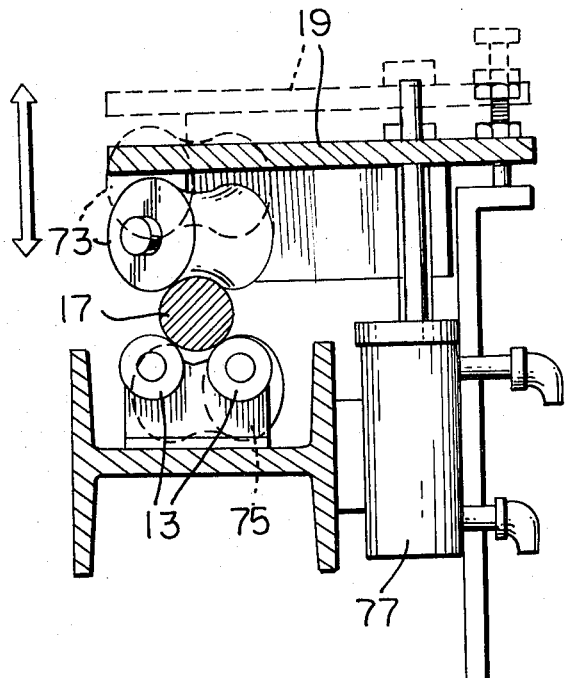
FIG. 8 is a cross sectional view of the axial transfer means illustrated in FIG. 7.

As illustrated in FIG. 7, the axial transfer means is energized by an air driven motor or other energy source 71 which of course may be controlled from the control panel 63. The energy source 71 selectively drives one of the two rollers 73 and 75. These two rollers 73 and 75 are rotatable about their respective axes and have concave lateral surfaces which selectively contact the bar 17. The roller axes are relatively skewed and each roller axis is skewed relative to the axis of the bar 17. When the air driven motor 71 is energized and the concave lateral surfaces of the two rollers are contacting the bar 17, rotation and axial motion is imparted to the bar so as to revolve the bar about its own axis while simultaneously moving the bar axially along that axis and into the lathe 11. Reversing the direction of drive of the motor 71 of course imparts an oppositely directed motion to the bar 17 to remove it from the lathe 11.

It is desirable that during lathe operation, the rollers 73 and 75 be retracted so as to not contact the bar 17 to either impede its rotation or wear the rollers. This is accomplished by another air cylinder 77 of FIG. 8 which of course could be automatically actuated or actuated by the appropriate control on the control panel 63. Actuation of the air cylinder 77 allows the lower roller 75 to drop away from the bar of stock 17 and raises the upper roller 73. A bar of stock is now in the lathe and one or more parts may be machined from this bar of stock in accordance with well known principles.

Assume now that all of the parts desired to be cut or machined from the bar of stock presently in the lathe have been cut and that the lathe operator requires a new bar of stock from storage of, for example, a different material. In this case, the air cylinder 77 is actuated to cause the roller 73 to mvoe downwardly until it contacts the bar 17. Further actuation of the air cylinder 77 raises the lower roller 75 into contact with the bar 17. Air driven motor 71 is now actuated in the appropriate direction to withdraw the bar 17 from the lathe. After the bar has withdrawn from the lathe to a preferred location along the bar support rack, the air driven motor 71 of course is shut off and air cylinder 77 is actuated in its reverse direction allowing the lower roller 75 to drop until a stop is reached at which time the upper roller 73 is lifted slightly so as to again completely clear the rollers 73 and 75 from contact with the bar 17. Air cylinder 65 is next actuated to lift the retaining roller 15 and the lateral transfer means 67. The operator now depresses the lever 77 of FIGS. 1 and 3 to thus rotate the rod 79 which in turn causes the several lateral arms 81 to move the bar of stock up over the lip 59 and back into the trough, the bar of stock now being in the position illustrated as 69 in FIG. 5. Air cylinder 65 may now be actuated to lower the retaining roller 15 and the lateral transfer means 67 so that the bar of stock returns to the position illustrated as 61 in FIG. 5. The operator next pulls pin 57 outwardly and opens the keeper 51 of the slot into which he wishes to load the bar of stock and when that keeper is opened, depresses the foot pedal 83 which actuates one or more lateral return members 85 to force the bar of stock back into the appropriate slot in the magazine. The lever 55 is again moved to close the keeper and thus complete the transfer of a bar of stock from the lathe to the storage magazine. The operator may now select a bar of stock of a different type, i.e., a different material or differently sized material by rotating the magazine to a new position and changing the bed height when necessary.

In light of the foregoing detailed disclosure, numerous modifications will readily suggest themselves to one of ordinary skill in the art and accordingly, the scope of the present invention is to be measured only by that of the appended claims.

What we claim as new and desire to secure by Letters Patent of the United States is:

1. In combination with a device having a predetermined axis and for processing a bar of stock, a bar stock storage dispensing and feeding system comprising:
   a rotatable magazine comprising a plurality of spaced members supported on and rotatable about a common axis, said magazine including aligned stock retaining means adapted to store a plurality of bars of stock;
   a bar support structure adjacent said magazine and axially aligned with the predetermined axis for receiving a bar of stock from said magazine;
   axial drive means for moving a bar of stock along said bar support structure to selectively insert and remove the bar from the device; said axial drive means including first and second rollers having first and second roller axes respectively, each said roller having a concave lateral surface which selectively contacts a bar in said bar support structure, said roller axes being relatively skewed and each roller axis being skewed relative to the axis of revolution of said device;
   means for selectively driving at least one of said rollers to revolve about its axis and thereby impart both axial and rotational motion to said bar; and
   means for selectively transferring a bar of stock between the magazine and bar support structure; and
   means for selectively moving said roller axes away and toward the predetermined axis to thereby selectively disengage and engage said axial drive means.

2. In combination with a device having a predetermined axis and for processing a bar of stock, a bar stock storage dispensing and feeding system comprising:
   a rotatable megazine comprising a plurality of spaced members supported on and rotatable about a common axis, said magazine including aligned stock retaining means adapted to store a plurality of bars of stock;
   a bar support structure adjacent said magazine and axially aligned with the predetermined axis for receiving a bar of stock from said magazine;
   axial drive means for moving a bar of stock along said bar support structure to selectively insert and remove the bar from the device;
   means for selectively transferring a bar of stock between the magazine and bar support structure; and
   a trough intermediate said bar support structure and said magazine whereby bidirectional transfer of a bar of stock between said magazine and said bar support structure may be effected.

3. The structure of claim 2 further comprising a loading platform adapted to support a bar of stock in a position removed from but substantially parallel to the predetermined axis, said loading platform being positioned relatively to said rotatable magazine so that the bar of stock may be moved laterally into the stock retaining means.

4. The structure of claim 3 further comprising restricting means associated with at least one of said spaced members and selectively movable between a first position for preventing the inadvertent removal of a bar from the retaining means and a second position for allowing a bar of stock to be inserted in said magazine from said loading platform.

5. The structure of claim 4 wherein both removal from and insertion into the rotatable magazine are possible when said restricting means is in said second position.

6. The structure of claim 2 wherein said bar support structure comprises a plurality of pairs of rollers adapted to support said bar for rotation relative to the device and at least one retaining roller, said retaining roller movable between a first position wherein said bar support structure may receive a bar of stock and a second position for retaining a bar of stock on said bar support structure.

7. A bar stock storage, dispensing, and feeding system comprising:
a rotatable magazine comprising a plurality of slotted spaced members supported on and rotatable about a common axis;
said members each having a plurality of angularly spaced apart slots with each of the slots opening at an outer peripheral region of the member in which the slot is formed;
said members being disposed in alignment with one another at spaced apart locations along the common axis;
a loading platform adapted to support a bar of stock in a position removed from but substantially parallel to the common axis, said loading platform being positioned relative to said rotatable magazine so that the bar of stock may be moved into the aligned slots of at least two adjacent ones of said spaced members;
keeper means mounted on at least one of said members for closing slot openings adjacent said outer peripheral region and preventing the inadvertent removal of a bar from a slot; and
means for engaging a bar adjacent to said magazine and transferring that bar to a bar support rack.

8. The structure of claim 7 wherein said means for engaging and transferring comprises:
means for moving a bar laterally away from said rotatable magazine; said structure further comprising means for moving a bar axially along the bar support rack in a direction parallel to said common axis toward the material processing device along a fixed axis of movement.

9. The structure of claim 8 wherein said means for moving a bar axially comprises:
first and second rollers having first and second roller axes respectively, each said roller having a concave lateral surface for contacting said bar, said roller axes being relatively skewed and each roller axis being skewed relative to the fixed axis of movement; and
means for selectively driving one of said rollers to revolve about its axis and thereby impart both axial and rotational motion to said bar.

10. The structure of claim 9 further comprising means for selectively moving the roller axes away from the fixed axis of movement and toward the fixed axis of movement to thereby selectively engage said axial moving means.

11. The structure of claim 8 wherein said structure includes:
a trough into which a bar may roll from said magazine; and
said means for engaging and transferring is effective to move a bar from said trough into a position for axial movement toward the material processing device.

12. The structure of claim 11 wherein said means for engaging and transferring comprises a plurality of lateral transfer devices lying along the bottom of said trough and movable upwardly to raise said bar and allow it to roll out of said trough and into said axial movement position.

13. The structure of claim 12 further comprising:
lateral reject means actuable to move a bar from said axial movement position back into said trough;
lateral return means for moving a bar from said trough into said magazine; and
retaining means for movably securing a bar in said axial motion position.

14. The structure of claim 13 wherein said retaining means is selectively movable between a bar retaining position and a position allowing the effective actuation of said lateral reject means.

15. The structure of claim 14 wherein said retaining means is mechanically linked to and actuable with said lateral discharge means.

16. The structure of claim 11 further comprising lateral reject means actuable to move a bar from said axial movement position back into said trough; and
lateral return means for moving a bar from said trough into said magazine.

* * * * *